US012091721B2

(12) United States Patent
Kim et al.

(10) Patent No.: US 12,091,721 B2
(45) Date of Patent: Sep. 17, 2024

(54) NON-ORIENTED ELECTRICAL STEEL SHEET AND MANUFACTURING METHOD THEREFOR

(71) Applicant: POSCO, Pohang-si (KR)

(72) Inventors: Jae-Hoon Kim, Pohang-si (KR); Yong-Soo Kim, Pohang-si (KR); Su-Yong Shin, Pohang-si (KR)

(73) Assignee: POSCO CO., LTD, Pohang-si (KR)

( * ) Notice: Subject to any disclaimer, the term of this patent is extended or adjusted under 35 U.S.C. 154(b) by 821 days.

(21) Appl. No.: 17/280,474

(22) PCT Filed: Sep. 27, 2019

(86) PCT No.: PCT/KR2019/012630
§ 371 (c)(1),
(2) Date: Jun. 23, 2021

(87) PCT Pub. No.: WO2020/067794
PCT Pub. Date: Apr. 2, 2020

(65) Prior Publication Data

US 2021/0355558 A1 Nov. 18, 2021

(30) Foreign Application Priority Data

Sep. 27, 2018 (KR) ........................ 10-2018-0115276

(51) Int. Cl.

| | |
|---|---|
| ***C21D 9/46*** | (2006.01) |
| ***C21D 6/00*** | (2006.01) |
| ***C21D 8/12*** | (2006.01) |
| ***C22C 38/00*** | (2006.01) |
| ***C22C 38/02*** | (2006.01) |
| ***C22C 38/04*** | (2006.01) |
| ***C22C 38/06*** | (2006.01) |
| ***H01F 1/147*** | (2006.01) |

(52) U.S. Cl.
CPC ............... *C21D 9/46* (2013.01); *C21D 6/005* (2013.01); *C21D 6/008* (2013.01); *C21D 8/1222* (2013.01); *C21D 8/1233* (2013.01); *C21D 8/1272* (2013.01); *C22C 38/002* (2013.01); *C22C 38/02* (2013.01); *C22C 38/04* (2013.01); *C22C 38/06* (2013.01); *H01F 1/147* (2013.01); *C21D 2201/05* (2013.01); *C22C 2202/02* (2013.01)

(58) Field of Classification Search
CPC .... C21D 2201/05; C21D 6/005; C21D 6/008; C21D 8/1222; C21D 8/1233; C21D 8/1272; C21D 9/46; C22C 2202/02; C22C 38/00; C22C 38/001; C22C 38/002; C22C 38/004; C22C 38/02; C22C 38/04; C22C 38/06; C22C 38/12; C22C 38/14; H01F 1/147; H01F 1/14791; H01F 1/16
See application file for complete search history.

(56) References Cited

U.S. PATENT DOCUMENTS

| | | | | |
|---|---|---|---|---|
| 2012/0014828 | A1 | 1/2012 | Miyazaki et al. | |
| 2015/0279531 | A1 | 10/2015 | Miyazaki et al. | |
| 2016/0042850 | A1 | 2/2016 | Oda et al. | |
| 2016/0076125 | A1 | 3/2016 | Koseki et al. | |
| 2017/0044641 | A1 | 2/2017 | Fortunati | |
| 2019/0189318 | A1 * | 6/2019 | Uesaka ................ | C21D 8/1266 |
| 2021/0062281 | A1 * | 3/2021 | Lee ...................... | C21D 8/1222 |

FOREIGN PATENT DOCUMENTS

| | | | |
|---|---|---|---|
| CN | 108368584 | A | 8/2018 |
| CN | 113166873 | B | 5/2023 |
| JP | 10-183248 | A | 7/1998 |
| JP | 2004-197217 | A | 7/2004 |
| JP | 2009007592 | A * | 1/2009 |
| JP | 2013-044012 | A | 3/2013 |
| JP | 2014-185365 | A | 10/2014 |
| JP | 2017-119897 | A | 7/2017 |
| JP | 6210182 | B1 | 10/2017 |
| JP | 2018-066033 | A | 4/2018 |
| KR | 10-2012-0014576 | A | 2/2012 |
| KR | 10-1297864 | B1 | 8/2013 |
| KR | 10-1728028 | B1 | 4/2017 |
| KR | 10-2018-0070951 | A | 6/2018 |
| WO | 2017-115657 | A1 | 7/2017 |
| WO | 2018/025941 | A1 | 2/2018 |
| WO | 2018-117600 | A1 | 6/2018 |

OTHER PUBLICATIONS

Extended European Search Report corresponding to EP Application No. 19865506.0 dated Aug. 17, 2021.
Written Opinion and International Search Report dated Jan. 14, 2020 issued in International Patent Application No. PCT/KR2019/012630 (with partial English translation).

* cited by examiner

*Primary Examiner* — Jenny R Wu
(74) *Attorney, Agent, or Firm* — Morgan, Lewis & Bockius LLP

(57) ABSTRACT

The present invention relates to a non-grain-oriented electrical steel sheet which is excellent in high-frequency iron loss, and a manufacturing method thereof.
A non-grain-oriented electrical steel sheet according to an exemplary embodiment of the present invention includes 2.5 to 3.8 wt % of Si, 0.5 to 2.5 wt % of Al, 0.2 to 4.5 wt % of Mn, 0.0005 to 0.02 wt % of As, 0.0005 to 0.01 wt % of Bi, the balance Fe, and inevitable impurities, and satisfies the following [Equation 1].

$$0.3 \leq [\text{surface fine crystal grain diameter}] \times [\text{fine grain formation thickness}] \times ([As]/[Bi]) \leq 5.0 \quad \text{[Equation 1]}$$

In Equation 1, [surface fine crystal grain diameter] means an average particle diameter (μm) of fine crystal grains in an electrode surface layer of an electrical steel sheet, [fine grain formation thickness] means a thickness (mm) of an electrode surface layer in which fine crystal grains are formed, and [As] and [Bi] mean a composition (wt %) of As and a composition (wt %) of Bi, respectively.

13 Claims, No Drawings

NON-ORIENTED ELECTRICAL STEEL SHEET AND MANUFACTURING METHOD THEREFOR

CROSS-REFERENCE OF RELATED APPLICATIONS

This application is the U.S. National Phase under 35 U.S.C. § 371 of International Patent Application No. PCT/KR2019/012630, filed on Sep. 27, 2019, which in turn claims the benefit of Korean Application No. 10-2018-0115276, filed on Sep. 27, 2018, the entire disclosures of which applications are incorporated by reference herein.

TECHNICAL FIELD

The present invention relates to a non-grain-oriented electrical steel sheet and a method for manufacturing the same. More specifically, the present invention relates to a non-grain-oriented electrical steel sheet used for an iron core of a motor and a method for manufacturing the same, and to a non-grain-oriented electrical steel sheet having a low high-frequency iron loss and a high magnetic flux density, and a method for manufacturing the same.

BACKGROUND ART

Efficient use of electric energy has become a big issue for improving the global environment, such as energy saving, reduction of fine dust generation, and reduction of greenhouse gases. Currently, more than 50% of the total electric energy generated is consumed by electric motors, so that there is a need for improving the efficiency of electric motors in order to efficiently use electricity. Recently, as the fields of eco-friendly vehicles (hybrid, plug-in-hybrid, electric, fuel cell vehicles) have been rapidly developed, interest in high-efficiency driving motors has rapidly increased, and furthermore, recognition of high efficiency such as high-efficiency motors for home appliances and super-premium motors requiring high yielding electricity and government regulations continue, so that it can be said that the demand for efficient use of electric energy is higher than ever.

Meanwhile, in order to improve the efficiency of electric motors, optimization is very important in all areas from material selection to design, assembly, and control. Particularly in terms of materials, the magnetic characteristics of electrical steel sheets are the most important, and there is a high demand for low iron loss and high magnetic flux density. Iron loss means energy loss occurring at a specific magnetic flux density and frequency, and magnetic flux density means the degree of magnetization obtained under a specific magnetic field. The lower the iron loss, the more energy efficient motors may be manufactured under the same condition, and the higher the magnetic flux density, the smaller the motor and the copper loss may be reduced. In this case, the characteristics of high-frequency low iron loss are very important for automobile drive motors or air conditioning compressors that need to be driven not only in the commercial frequency range but also in the high frequency range.

In order to obtain such high-frequency low iron loss characteristics, a large amount of specific resistance elements such as Si, Al, and Mn need to be added in the manufacturing process of a steel sheet, and the inclusions and fine precipitates present inside the steel sheet need to be actively controlled to prevent the inclusions and fine precipitates from interfering with the magnetic domain wall movement. However, in order to purify the impurity elements such as C, S, N, Ti, Nb, and V during the steel manufacturing to an extremely low level for controlling inclusions and fine precipitates, high quality raw materials need to be used, and there is a problem in that the productivity deteriorates because it takes a long time to perform secondary refining.

Therefore, although studies for controlling impurity elements to an extremely low level and a method for adding a large amount of a specific resistance element such as Si, Al, and Mn have been conducted, the substantial application results in this regard are insignificant.

DISCLOSURE

Description of the Drawings

The present invention has been made in an effort to provide a non-grain-oriented electrical steel sheet and a method for manufacturing the same. More specifically, the present invention relates to a non-grain-oriented electrical steel sheet used for an iron core of a motor and a method for manufacturing the same, and has been made in an effort to provide a non-grain-oriented electrical steel sheet having a low high-frequency iron loss and a high magnetic flux density, and a method for manufacturing the same.

A non-grain-oriented electrical steel sheet according to an exemplary embodiment of the present invention includes 2.5 to 3.8 wt % of Si, 0.5 to 2.5 wt % of Al, 0.2 to 4.5 wt % of Mn, 0.0005 to 0.02 wt % of As, 0.0005 to 0.01 wt % of Bi, the balance Fe, and inevitable impurities, and satisfies the following [Equation 1].

$$0.3 \leq [\text{surface fine crystal grain diameter}] \times [\text{fine grain formation thickness}] \times ([As]/[Bi]) \leq 5.0 \quad \text{[Equation 1]}$$

In Equation 1, [surface fine crystal grain diameter] means an average particle diameter (μm) of fine crystal grains in an electrode surface layer of an electrical steel sheet, [fine grain formation thickness] means a thickness (mm) of an electrode surface layer in which fine crystal grains are formed, and [As] and [Bi] mean a composition (wt %) of As and a composition (wt %) of Bi, respectively.

In the non-grain-oriented electrical steel sheet according to an exemplary embodiment of the present invention, a sum of As and Bi may be 0.0005 to 0.025%.

The non-grain-oriented electrical steel sheet according to an exemplary embodiment of the present invention may satisfy [Equation 2].

$$1 \leq [As]/[Bi] \leq 10 \quad \text{[Equation 2]}$$

In Equation 2, [As] and [Bi] mean a composition (wt %) of As and a composition (wt %) of Bi in a slab, respectively.

Fine crystal grains of less than 25% of the average crystal grain diameter may be present in an electrode surface layer within 10% of the thickness of the electric steel sheet.

The electrical steel sheet may further include one or more of 0.0040 wt % or less (excluding 0 wt %) of N, 0.0040 wt % or less (excluding 0 wt %) of C, 0.0040 wt % or less (excluding 0 wt %) of S, 0.0040 wt % or less (excluding 0 wt %) of Ti, 0.0040 wt % or less (excluding 0 wt %) of Nb, and 0.0040 wt % or less (excluding 0 wt %) of V.

The electrical steel sheet may have a specific resistance of 45 μω·cm or more.

The electrical steel sheet may have an iron loss ($W_{0.5/10000}$) of 10 W/kg or less.

Meanwhile, a method for manufacturing a non-grain-oriented electrical steel sheet according to an exemplary embodiment of the present invention includes: a step for heating a slab including 2.5 to 3.8 wt % of Si, 0.5 to 2.5 wt % of Al, 0.2 to 4.5 wt % of Mn, 0.0005 to 0.02 wt % of As, 0.0005 to 0.01 wt % of Bi, the balance Fe, and inevitable impurities; a step for hot-rolling the slab to produce a hot-rolled sheet; a step for cold-rolling the hot-rolled sheet to produce a cold-rolled sheet; and a step for subjecting the cold-rolled sheet to final annealing to manufacture an electrical steel sheet.

In the slab, a sum of As and Bi may be 0.0005 to 0.025%.

The slab may satisfy [Equation 2].

$$1 \leq [As]/[Bi] \leq 10 \quad \text{[Equation 2]}$$

In Equation 2, [As] and [Bi] mean a composition (wt %) of As and a composition (wt %) of Bi in a slab, respectively.

In the step for subjecting the cold-rolled sheet to final annealing, a heating rate up to 700° C. may be set at 10° C./s or more.

A cold-rolled sheet manufactured by a manufacturing method according to an exemplary embodiment of the present invention may satisfy [Equation 1].

$$0.3 \leq [\text{surface fine crystal grain diameter}] \times [\text{fine grain formation thickness}] \times ([As]/[Bi]) \leq 5.0 \quad \text{[Equation 1]}$$

In Equation 1, [surface fine crystal grain diameter] means an average particle diameter (μm) of fine crystal grains in an electrode surface layer of an electrical steel sheet, [fine grain formation thickness] means a thickness (mm) of an electrode surface layer in which fine crystal grains are formed, and [As] and [Bi] mean a composition (wt %) of As and a composition (wt %) of Bi in a slab, respectively.

The slab may further include one or more of 0.0040 wt % or less (excluding 0 wt %) of N, 0.0040 wt % or less (excluding 0 wt %) of C, 0.0040 wt % or less (excluding 0 wt %) of S, 0.0040 wt % or less (excluding 0 wt %) of Ti, 0.0040 wt % or less (excluding 0 wt %) of Nb, and 0.0040 wt % or less (excluding 0 wt %) of V.

After the step for manufacturing a hot-rolled sheet, the manufacturing method may further include a step for subjecting the hot-rolled sheet to hot-rolled sheet annealing.

A non-grain-oriented electrical steel sheet according to an exemplary embodiment of the present invention may improve the iron loss at a high-frequency region according to a skin effect by promoting the formation of surface fine crystal grains when the warming rate is optimized during a final annealing by adding As and Bi at a predetermined ratio.

Therefore, the non-grain-oriented electrical steel sheet according to an exemplary embodiment of the present invention is suitable for high-speed rotation.

Advantageous Effect

By providing a technique capable of manufacturing such a non-grain-oriented electrical steel sheet, it is possible to contribute to the manufacture of eco-friendly motors for automobiles, motors for high-efficiency home appliances, and super-premium-class electric motors.

MODE FOR INVENTION

In the present specification, terms such as first, second, and third are used to describe various parts, components, regions, layers, and/or sections, but are not limited thereto. These terms are used only to distinguish one part, component, region, layer or section from another part, component, region, layer or section. Therefore, a first part, component, region, layer or section described below may be referred to as a second part, component, region, layer or section within the scope of the present invention.

When one part "includes" one constituent element in the present specification, unless otherwise specifically described, this does not mean that another constituent element is excluded, but means that another constituent element may be further included.

In the present specification, the used terminology is merely for reference to specific embodiments and is not intended to limit the present invention. The singular forms used herein also include the plural forms unless the phrases do not express the opposite meaning explicitly. As used herein, the meaning of "include" specifies a specific feature, region, integer, step, action, element and/or component, and does not exclude the presence or addition of a different feature, region, integer, step, action, element, and/or component.

In the present specification, the term "combination thereof" included in the Markush type expression means a mixture or combination of one or more selected from the group consisting of constituent elements described in the Markush type expression, and means including one or more selected from the group consisting of the above-described constituent elements.

In the present specification, when a part is referred to as being "above" or "on" another part, it may be directly above or on another part or may be accompanied by another part therebetween. In contrast, when it is mentioned that a part is "directly above" another part, no other part is interposed therebetween.

Unless otherwise defined, all terms including technical terms and scientific terms used herein have the same meaning as commonly understood by those skilled in the art to which the present invention pertains. Commonly used predefined terms are further construed to have meanings consistent with the relevant technical literature and the present disclosure and are not to be construed as ideal or very formal meanings unless defined otherwise.

Further, unless otherwise specified, % means wt %, and 1 ppm is 0.0001 wt %.

In an exemplary embodiment of the present invention, the meaning of further including an additional element means that an additional amount of the additional element is included by being substituted for the balance iron (Fe).

Hereinafter, examples of the present invention will be described in detail such that those having ordinary skill in the art to which the present invention pertains can easily carry out the examples. As those skilled in the art would realize, the described embodiments may be modified in various different ways, all without departing from the spirit or scope of the present invention.

In order to improve the high-frequency iron loss of a non-grain-oriented electrical steel sheet, the crystal grain diameter needs to be made small, and furthermore, the crystal grains of the surface layer need to be made much finer due to the skin effect. However, dualization of the crystal grain diameter in the steel sheet may cause magnetic deterioration due to the introduction of precipitates and the like. An object of the present invention is to more easily manufacture an electrical steel sheet which is excellent not only in productivity, but also in high-frequency iron loss by using special elements As and Bi to prepare fine crystal grains on the surface. Hereinafter, conditions for achieving the object will be described.

A non-grain-oriented electrical steel sheet according to an exemplary embodiment of the present invention includes 2.5 to 3.8 wt % of Si, 0.5 to 2.5 wt % of Al, 0.2 to 4.5 wt % of Mn, 0.0005 to 0.02 wt % of As, 0.0005 to 0.01 wt % of Bi, the balance Fe, and inevitable impurities, and satisfies the following [Equation 1].

$$0.3 \leq [\text{surface fine crystal grain diameter}] \times [\text{fine grain formation thickness}] \times ([As]/[Bi]) \leq 5.0 \quad \text{[Equation 1]}$$

In Equation 1, [surface fine crystal grain diameter] means an average particle diameter (μm) of fine crystal grains in an electrode surface layer of an electrical steel sheet, [fine grain formation thickness] means a thickness (mm) of an electrode surface layer in which fine crystal grains are formed, and [As] and [Bi] mean a composition (wt %) of As and a composition (wt %) of Bi, respectively.

More specifically, it is possible to further include one or more of 0.0040 wt % or less (excluding 0 wt %) of N, 0.0040 wt % or less (excluding 0 wt %) of C, 0.0040 wt % or less (excluding 0 wt %) of S, 0.0040 wt % or less (excluding 0 wt %) of Ti, 0.0040 wt % or less (excluding 0 wt %) of Nb, and 0.0040 wt % or less (excluding 0 wt %) of V.

More specifically, a sum of As and Bi may be 0.0005 to 0.025%.

More specifically, it is possible to satisfy [Equation 2].

$$1 \leq [As]/[Bi] \leq 10 \quad \text{[Equation 2]}$$

In Equation 2, [As] and [Bi] mean a composition (wt %) of As and a composition (wt %) of Bi in a slab, respectively.

First, a reason for limiting the components of the non-grain-oriented electrical steel sheet will be described.

2.5 to 3.8 wt % of Si

Si serves to lower the iron loss by increasing the specific-resistance of a material, and when Si is added in a very small amount, the effect of improving the high-frequency iron loss may be insufficient. In contrast, when Si is added in a very large amount, the hardness of a material is increased, so that the cold rollability may extremely deteriorate, and as a result, the productivity and the punchability may deteriorate. Therefore, Si may be added within the above-described range. More specifically, 2.7 to 3.5 wt % of Si may be included.

0.5 to 2.5 wt % of Al

Al serves to lower the iron loss by increasing the specific resistance of a material, and when Al is added in a very small amount, there is no effect of reducing the high-frequency iron loss and a nitride is finely formed, so that the magnetism may deteriorate. In contrast, when Al is added in a very large amount, problems occur in all processes such as steel manufacturing and continuous casting, so that productivity may significantly deteriorate. Therefore, Al may be added within the above-described range. More specifically, 0.5 to 2.0 wt % of Al may be included. More specifically, 0.5 to 1.5 wt % of Al may be included.

0.2 to 4.5 wt % of Mn

Mn serves to improve the iron loss and form a sulfide by increasing the specific resistance of a material, and when Mn is added in a very small amount, MnS is finely precipitated, so that the magnetism deteriorates. In contrast, when Mn is added in a very large amount, the magnetic flux density may be rapidly decreased by promoting the formation of a [111]texture which is disadvantageous for magnetism. Therefore, Mn may be added within the above-described range. More specifically, 0.3 to 4.0 wt % of Mn may be included. More specifically, 0.4 to 3.0 wt % of Mn may be included.

0.0005 to 0.02 wt % of as

As serves to adjust the growth property of crystal grains by segregating on the surface layer. Basically, in an exemplary embodiment of the present invention, not only the range of the main additive components Si, Al and Mn is optimized, but also small amounts of the special additive elements As and Bi are added at a predetermined ratio in order to solve problems in the related art. In addition, a range of excellent magnetism was limited by controlling the warming rate during final annealing, which will be mentioned later in the description of the manufacturing method to form fine particles on the surface. In this case, when As is added in a very small amount, As is not sufficiently segregated, and thus cannot serve to promote the growth property of crystal grains. In contrast, when As is added in a very large amount, the growth property of crystal grains of the entire steel sheet is suppressed, so that the magnetism may deteriorate. Therefore, As may be added within the above-described range. More specifically, 0.001 to 0.02 wt % of As may be included.

0.0005 to 0.01 wt % of Bi

Bi serves as an additive that helps the surface segregation of As. When Bi is added in a very small amount, it is possible to promote the micronization of crystal grains on an electrode surface layer in the annealing process by helping the surface segregation of As. In contrast, when Bi is added in a very large amount, the formation of fine precipitates is promoted, so that the iron loss may deteriorate. Therefore, Bi may be added within the above-described range. More specifically, 0.0007 to 0.01 wt % of Bi may be included.

Each 0.004 wt % or less of other impurity elements C, S, N, Ti, Nb, and V

N is bonded to Ti, Nb, and V to form a nitride or a carbide. The finer the size of such a nitride or carbide is, the more the growth property of crystal grains deteriorates, but since the degree and role of each nitride or carbide are different, the nitride or carbide can be added in a content within the above-described range in consideration of this.

C reacts with N, Ti, Nb, V and the like to form fine carbides, and thus serves to interfere with the growth property of crystal grains and the magnetic domain movement, and causes magnetic aging, so that C may be added within the above-described range.

S forms a sulfide to make the growth property of crystal grains deteriorate, and thus may be added within the above-described range. More specifically, 0.003 wt % or less of each of C, S, N, Ti, Nb and V may be included.

The present invention includes Fe and inevitable impurities other than the components. The present invention does not exclude the addition of effective components other than the components.

Next, a reason for limiting the addition ratio between the component elements of the non-grain-oriented electrical steel sheet will be described.

0.0005 to 0.025 of [As]+[Bi], and 1 to 10 of [As]/[Bi]

Since [As]+[Bi] are present in a predetermined amount or more and segregate in an electrode surface layer, only one of As or Bi is present, and when the sum is too large, the growth property of crystal grains extremely deteriorates due to the formation of fine precipitates. Further, a reason for limiting the [As]/[Bi] ratio is that electrode surface segregation does not occur sufficiently in a very small range and thus, it may be difficult to promote crystal grains. In contrast, within a very large range, surface fine crystal grain diameter is rarely produced because there Bi does not serve as a catalyst, so that the ratio can be limited.

$$0.3 \leq [\text{surface fine crystal grain diameter } (\mu m)] \times [\text{fine grain formation thickness } (mm)] \times ([As]/[Bi]) \leq 5.0$$

The surface fine crystal grain diameter and fine grain formation thickness formed during annealing were formulated by finding the dependence on the ratio of [As]/[Bi]. Few fine particles may be formed within a range that is too small. In contrast, within a range that is too large, the surface fine crystal grains are coarsened, and thus become almost the same as the average crystal grains, so that the range needs to be controlled within the above-described range. Here, [surface fine crystal grain diameter] means an average particle diameter (μm) of fine crystal grains in an electrode surface layer of an electrical steel sheet, [fine grain formation thickness] means a thickness (mm) of an electrode surface layer in which fine crystal grains are formed, and [As] and [Bi] mean a composition (wt %) of As and a composition (wt %) of Bi, respectively More specifically, [surface fine crystal grain diameter] may mean a size of fine crystal grains having a size of less than 25% of the average crystal grain diameter present in the electrode surface layer of the electrical steel sheet. More specifically, [surface fine crystal grain diameter] may be 13 μm or more. More specifically, [surface fine crystal grain diameter] may be 15 μm to 20 μm.

More specifically, [fine grain formation thickness] may mean an electrode surface layer in which fine crystal grains within 10% of the thickness of an electrical steel sheet are present. More specifically, [fine grain formation thickness] may be 11 μm or more. More specifically, [fine grain formation thickness] may be 15 μm to 30 μm.

Therefore, in the non-grain-oriented electrical steel sheet according to an exemplary embodiment of the present invention, fine crystal grains having a particle diameter of less than 25% of the average crystal particle diameter may be present in an electrode surface layer within 10% of the thickness of the electrical steel sheet.

The non-grain-oriented electrical steel sheet according to an exemplary embodiment of the present invention may have a specific resistance of 45 μΩ·cm or more. More specifically, the specific resistance may be 53 μΩ·cm or more. More specifically, the specific resistance may be 64 μΩ·cm or more. The upper limit thereof is not particularly limited, but may be 100 μΩ·cm or less.

The non-grain-oriented electrical steel sheet according to an exemplary embodiment of the present invention may have a high-frequency iron loss ($W_{0.5/10000}$) of 10 W/kg or less. More specifically, the high-frequency iron loss may be 9 W/kg or less. More specifically, high-frequency iron loss may be 8.5 W/kg or less. The lower limit thereof is not particularly limited, but may be 7.0 W/kg or more. In an exemplary embodiment of the present invention, since the high-frequency iron loss is very low, the fuel economy is excellent at high speed running particularly when the non-grain-oriented electrical steel sheet is used as an automobile motor.

The non-grain-oriented electrical steel sheet according to an exemplary embodiment of the present invention may have an iron loss ($W_{10/400}$) of 15.5 W/kg or less. More specifically, the iron loss may be 14.8 W/kg or less.

The non-grain-oriented electrical steel sheet according to an exemplary embodiment of the present invention may have a magnetic flux density ($B_{50}$) of 1.63 T or more. When the magnetic flux density is 1.63 T, it is characterized that when the non-grain-oriented electrical steel sheet is used as an automobile motor, the torque is excellent during start and acceleration.

A method for manufacturing a non-grain-oriented electrical steel sheet according to an exemplary embodiment of the present invention includes: a step for preparing a slab including 2.5 to 3.8 wt % of Si, 0.5 to 2.5 wt % of Al, 0.2 to 4.5 wt % of Mn, 0.0005 to 0.02 wt % of As, 0.0005 to 0.01 wt % of Bi, the balance Fe, and inevitable impurities; a step for heating the slab; a step for hot-rolling the heated slab to produce a hot-rolled sheet; a step for cold-rolling the hot-rolled sheet to produce a cold-rolled sheet; and a step for subjecting the cold-rolled sheet to final annealing to manufacture an electrical steel sheet, in which a heating rate up to 700° C. is set at 10° C./s or more. Hereinafter, the manufacturing method will be specifically described for each step.

First, a slab satisfying the above-described composition is prepared. Since a reason for limiting the addition ratio of each composition in the slab is the same as the reason for limiting the composition of the non-grain-oriented electrical steel sheet described above, the repeated description will be omitted. Since the composition of the slab does not substantially change in the manufacturing process such as hot rolling, hot-rolled sheet annealing, cold rolling, and final annealing to be described below, the composition of the slab and the composition of the non-grain-oriented electrical steel sheet are substantially the same as each other.

When alloying elements are added to molten steel at such a steel manufacturing step, Si, Al and Mn are first added, then one or more of As or Bi is or are introduced, and then As and Bi may be allowed to react by performing bubbling sufficiently for 5 minutes or more using Ar gas and the like. Thereafter, a slab may be produced by solidifying the controlled molten steel in a continuous casting process.

Next, the produced slab is heated. By heating the produced slab, a subsequent hot rolling process may be smoothly performed and the slab may be subjected to homogenization treatment. More specifically, heating may mean reheating. In this case, the slab heating temperature may be 1100 to 1250° C. When the heating temperature of the slab is too high, precipitates are re-dissolved, and thus may be finely precipitated after hot rolling.

Next, a hot-rolled sheet is produced by hot-rolling the heated slab. A finish rolling temperature of hot rolling may be 800° C. or more.

After the step for producing the hot-rolled sheet, a step for subjecting the hot-rolled sheet to hot-rolled sheet annealing may be further included. In this case, a hot-rolled sheet annealing temperature may be 850 to 1150° C. When the hot-rolled sheet annealing temperature is too low, the structure does not grow or grows finely, so that the effect of increasing the magnetic flux density is small, and conversely, when the hot-rolled sheet annealing temperature is too high, the magnetic characteristics rather deteriorate and the sheet shape is deformed, so that rolling workability may be worsened. More specifically, the temperature range may be 950 to 1125° C. More specifically, an annealing temperature of the hot-rolled sheet may be 900 to 1100° C. The hot-rolled sheet annealing is performed to increase an orientation which is advantageous for the magnetism, if necessary, and can also be omitted.

Next, a cold-rolled sheet is produced by washing the hot-rolled sheet with an acid and cold-rolling the acid-washed hot-rolled sheet so as to have a predetermined sheet thickness. Although a reduction ratio may be applied differently depending on the thickness of the hot-rolled sheet, a cold-rolled sheet may be produced by applying a reduction ratio of 70 to 95% and performing cold rolling so as to have a final thickness of 0.2 to 0.65 mm.

Next, an electrical steel sheet is manufactured by subjecting the cold-steel sheet to final annealing. The final annealing temperature may be 800 to 1050° C. When the final annealing temperature is too low, recrystallization does not occur sufficiently, and when the final annealing temperature is too high, rapid growth of crystal grains occurs, so that the magnetic flux density and high-frequency iron loss may deteriorate. More specifically, the cold-steel sheet may be subjected to final annealing at a temperature of 900 to 1000° C. In the final annealing process, all processed structures formed in the cold rolling step which is a previous step may be redetermined (that is, 99% or more).

In the step for subjecting the cold-rolled sheet to final annealing, the heating rate up to 700° C. may be controlled to 10° C./s or more. This is to promote electrode surface fine particles through the surface segregation of the special additive element. The electrode surface layer may mean within 10% of the thickness of the steel sheet, and the fine grain means a fine crystal grain diameter having a size of less than 25% of the average crystal grain diameter. More specifically, the heating rate up to 700° C. may be controlled to 13 to 35° C./s or more.

Thereafter, the cold-rolled sheet may be heated at a rate of 10 to 30° C./s from more than 700° C. to the above-described final annealing temperature.

In this case, an optical microscope may be used to confirm the crystal grain diameter of the electrode surface fine particles, and the observation surface is a cross section (TD surface) in the vertical direction of rolling.

Hereinafter, the present invention will be described in more detail through the Examples. However, it needs to be noted that the following Examples are merely for illustrating and explaining the present invention in more detail, and not for limiting the scope of the present invention. This is because the scope of the present invention is determined by the matters described in the claims and the matters reasonably inferred therefrom.

Example

A slab having the composition as shown in the following Table 1 and including the balance Fe and inevitable impurities was produced. Impurities C, S, N and Ti of the slab were all controlled at 0.003%. The slab was heated to 1150° C. and hot-rolled at a hot rolling finishing temperature of 850° C. to produce a hot-rolled sheet having a sheet thickness of 2.0 mm. The hot-rolled sheet is subjected to hot-rolled sheet annealing at 1100° C. for 4 minutes, then washed with an acid and cold-rolled to make a thickness of 0.25 mm, and subjected to final annealing at the temperature range and warming rate shown in Table 2. Therefore, as shown in Table 2, an annealed sheet having an average crystal grain diameter of 80 to 100 μm was manufactured. In this case, an optical microscope may be used to confirm the crystal grain diameter of the electrode surface fine particles, and the observation surface is a cross section (TD surface) in the vertical direction of rolling.

The specific resistance, magnetic flux density ($B_{50}$), iron loss ($W_{10/400}$), and high-frequency iron loss ($W_{0.5/100000}$) for each test piece are shown in the following Table 3. Such magnetic properties were determined as the average value in the rolling direction and the vertical direction using a single sheet tester. In this case, $B_{50}$ is a magnetic flux density induced at a magnetic field of 5000 A/m, $W_{10/400}$ means an iron loss when a magnetic flux density of 1.0 T is induced at a frequency of 400 Hz, and $W_{0.5/100000}$ means an iron loss when a magnetic flux density of 0.05 T is induced at a frequency of 100000 Hz.

In the case of steel grades belonging to the scope of the invention, a fine surface layer having a thickness of about 15 μm or more was formed, and the diameter of the surface fine grains was also about 15 μm or more. In this case, the high-frequency iron loss is excellent.

TABLE 1

| Classification | Si (%) | Al (%) | Mn (%) | As (%) | Bi (%) | As + Bi (%) | As/Bi |
|---|---|---|---|---|---|---|---|
| 1 | 2.8 | 0.5 | 0.5 | 0.005 | 0.001 | 0.006 | 5 |
| 2 | 2.8 | 0.5 | 0.5 | 0.004 | 0.005 | 0.009 | 0.8 |
| 3 | 2.8 | 0.5 | 0.5 | 0.01 | 0.001 | 0.011 | 10 |
| 4 | 3.1 | 0.7 | 1.5 | 0.02 | 0.01 | 0.03 | 2 |
| 5 | 3.1 | 0.7 | 1.5 | 0.025 | 0.01 | 0.035 | 2.5 |
| 6 | 3.1 | 0.7 | 1.5 | 0.015 | 0.02 | 0.035 | 0.75 |
| 7 | 3.1 | 0.7 | 1.5 | 0.01 | 0.003 | 0.013 | 3.3 |
| 8 | 3.1 | 0.7 | 1.5 | 0.005 | 0.003 | 0.008 | 1.7 |
| 9 | 2.7 | 1.5 | 2.5 | 0.005 | 0.003 | 0.008 | 1.7 |
| 10 | 2.7 | 1.5 | 2.5 | 0.005 | 0.0003 | 0.0053 | 16.7 |
| 11 | 2.7 | 1.5 | 2.5 | 0.02 | 0.003 | 0.023 | 6.7 |
| 12 | 2.8 | 0.8 | 1.8 | 0.0004 | 0.0003 | 0.0007 | 1.3 |
| 13 | 2.8 | 0.8 | 1.8 | 0.005 | 0.003 | 0.008 | 1.7 |
| 14 | 2.8 | 0.8 | 1.8 | 0.005 | 0.003 | 0.008 | 1.7 |
| 15 | 3.2 | 0.005 | 1.1 | 0.0012 | 0.0015 | 0.0027 | 0.8 |

TABLE 2

| Classification | Warming rate (° C./s) up to 700° C. during final annealing | Final annealing temperature (° C.) | Sheet thickness (mm) | Average crystal grain diameter (μm) | Fine particle formation thickness (mm) | Surface fine crystal grain diameter (μm) | Surface fine crystal grain*Surface layer thickness*As/Bi | Remark |
|---|---|---|---|---|---|---|---|---|
| 1 | 15 | 970 | 0.25 | 85 | 0.018 | 17 | 1.53 | Invention Example |
| 2 | 20 | 1000 | 0.25 | 96 | 0.012 | 5 | 0.05 | Comparative Example |
| 3 | 30 | 980 | 0.25 | 89 | 0.025 | 18 | 4.50 | Invention Example |
| 4 | 12 | 1050 | 0.25 | 86 | 0.01 | 7 | 0.14 | Comparative Example |
| 5 | 15 | 1070 | 0.25 | 82 | 0.009 | 10 | 0.23 | Comparative Example |
| 6 | 17 | 1070 | 0.25 | 88 | 0.012 | 9 | 0.08 | Comparative Example |
| 7 | 8 | 960 | 0.25 | 90 | 0.007 | 6 | 0.14 | Comparative Example |
| 8 | 15 | 980 | 0.25 | 95 | 0.018 | 19 | 0.57 | Invention Example |

TABLE 2-continued

| Classification | Warming rate (° C./s) up to 700° C. during final annealing | Final annealing temperature (° C.) | Sheet thickness (mm) | Average crystal grain diameter (μm) | Fine particle formation thickness (mm) | Surface fine crystal grain diameter (μm) | Surface fine crystal grain*Surface layer thickness*As/Bi | Remark |
|---|---|---|---|---|---|---|---|---|
| 9 | 25 | 970 | 0.25 | 97 | 0.021 | 19 | 0.67 | Invention Example |
| 10 | 25 | 940 | 0.25 | 88 | 0.006 | 5 | 0.50 | Comparative Example |
| 11 | 25 | 950 | 0.25 | 86 | 0.027 | 17 | 3.06 | Invention Example |
| 12 | 20 | 960 | 0.25 | 92 | 0.009 | 7 | 0.08 | Comparative Example |
| 13 | 5 | 970 | 0.25 | 88 | 0.011 | 8 | 0.15 | Comparative Example |
| 14 | 25 | 950 | 0.25 | 82 | 0.034 | 16 | 0.91 | Invention Example |
| 15 | 28 | 990 | 0.25 | 89 | 0.008 | 8 | 0.05 | Comparative Example |

TABLE 3

| Classification | Specific resistance | $B_{50}$ (T) | $W_{10/400}$ (W/kg) | $W_{0.5/100000}$ (W/kg) | Remark |
|---|---|---|---|---|---|
| 1 | 53 | 1.65 | 14.5 | 7.25 | Invention Example |
| 2 | 53 | 1.62 | 15.7 | 10.95 | Comparative Example |
| 3 | 53 | 1.66 | 14.2 | 8.42 | Invention Example |
| 4 | 65 | 1.62 | 16.8 | 11.25 | Comparative Example |
| 5 | 65 | 1.61 | 17.6 | 10.94 | Comparative Example |
| 6 | 65 | 1.61 | 16.5 | 10.54 | Comparative Example |
| 7 | 65 | 1.62 | 15.8 | 11.25 | Comparative Example |
| 8 | 65 | 1.64 | 14.8 | 7.89 | Invention Example |
| 9 | 75 | 1.65 | 13.9 | 8.26 | Invention Example |
| 10 | 75 | 1.61 | 16.2 | 10.56 | Comparative Example |
| 11 | 75 | 1.64 | 13.8 | 7.26 | Comparative Example |
| 12 | 64 | 1.62 | 16.8 | 11.12 | Comparative Example |
| 13 | 64 | 1.61 | 16.7 | 10.46 | Comparative Example |
| 14 | 64 | 1.63 | 14.7 | 8.12 | Invention Example |
| 15 | 56 | 1.62 | 15.9 | 11.66 | Comparative Example |

The present invention is not limited to the embodiments, and can be manufactured in various different forms, and those having ordinary skill in the art to which the present invention pertains will understand that the present invention can be implemented in other specific forms without changing the technical idea or essential features thereof. Therefore, it should be understood that the above-described embodiments are illustrative and not restrictive in all aspects.

The invention claimed is:

1. A non-grain-oriented electrical steel sheet comprising 2.5 to 3.8 wt % of Si, 0.5 to 2.5 wt % of Al, 0.2 to 4.5 wt % of Mn, 0.0005 to 0.02 wt % of As, 0.0005 to 0.01 wt % of Bi, the balance Fe, and inevitable impurities, and satisfying the following [Equation 1]

$$0.3 \leq [\text{surface fine crystal grain diameter}] \times [\text{fine grain formation thickness}] \times ([As]/[Bi]) \leq 5.0 \quad \text{[Equation 1]}$$

(in Equation 1, [surface fine crystal grain diameter] means an average particle diameter (μm) of fine crystal grains in an outermost surface layer of the non-grain-oriented electrical steel sheet, [fine grain formation thickness] means a thickness (mm) of the outermost surface layer in which fine crystal grains are formed, and [As] and [Bi] mean a composition (wt %) of As and a composition (wt %) of Bi, respectively, wherein the fine crystal grain is a grain having diameter less than 25% of the average crystal grain diameter, and the outermost surface layer is part from the surface to less than 10% of the thickness of the electrical steel sheet.

2. The non-grain-oriented electrical steel sheet of claim 1, wherein:

a sum of As and Bi is 0.0005 to 0.025%.

3. The non-grain-oriented electrical steel sheet of claim 1, wherein:

the non-grain-oriented electrical steel sheet satisfies the following [Equation 2]

$$1 \leq [As]/[Bi] \leq 10 \quad \text{[Equation 2]}$$

(in Equation 2, [As] and [Bi] mean a composition (wt %) of As and a composition (wt %) of Bi in a slab, respectively.

4. The non-grain-oriented electrical steel sheet of claim 1, wherein:

the non-grain-oriented electrical steel sheet further comprises one or more of 0.0040 wt % or less (excluding 0 wt %) of N, 0.0040 wt % or less (excluding 0 wt %) of C, 0.0040 wt % or less (excluding 0 wt %) of S, 0.0040 wt % or less (excluding 0 wt %) of Ti, 0.0040 wt % or less (excluding 0 wt %) of Nb, and 0.0040 wt % or less (excluding 0 wt %) of V.

5. The non-grain-oriented electrical steel sheet of claim 1, wherein:

the non-grain-oriented electrical steel sheet has a specific resistance of 45 μΩ·cm or more.

6. The non-grain-oriented electrical steel sheet of claim 1, wherein:

the non-grain-oriented electrical steel sheet may have an iron loss (W0.5/10000) of 10 W/kg or less.

7. The non-grain-oriented electrical steel sheet of claim 1, comprising 0.001 to 0.02 wt % of As.

8. The non-grain-oriented electrical steel sheet of claim 1, comprising 0.005 to 0.02 wt % of As.

9. A method for manufacturing a non-grain-oriented electrical steel sheet, the method comprising:

a step for preparing a slab comprising 2.5 to 3.8 wt % of Si, 0.5 to 2.5 wt % of Al, 0.2 to 4.5 wt % of Mn, 0.0005 to 0.02 wt % of As, 0.0005 to 0.01 wt % of Bi, the balance Fe, and inevitable impurities;

a step for heating the slab;

a step for hot-rolling the heated slab to produce a hot-rolled sheet;

a step for cold-rolling the hot-rolled sheet to produce a cold-rolled sheet; and a step for subjecting the cold-rolled sheet to final annealing to manufacture an electrical steel sheet, wherein in the step for subjecting the cold-rolled sheet to final annealing, a heating rate up to 700° C. is set at 10° C./s or more, wherein the electrical steel sheet satisfies [Equation 1]

$$0.3 \leq [\text{surface fine crystal grain diameter}] \times [\text{fine grain formation thickness}] \times ([As]/[Bi]) \leq 5.0 \quad \text{[Equation 1]}$$

in Equation 1, [surface fine crystal grain diameter] means an average particle diameter (μm) of fine crystal grains in an outermost surface layer of the non-grain-oriented electrical steel sheet, [fine grain formation thickness] means a thickness (mm) of the outermost surface layer in which fine crystal grains are formed, and [As] and [Bi] mean a composition (wt %) of As and a composition (wt %) of Bi, respectively, wherein the fine crystal grain is a grain having diameter less than 25% of the average crystal grain diameter, and the outermost surface layer is part from the surface to less than 10% of the thickness of the electrical steel sheet.

10. The method of claim 9, wherein:

a sum of As and Bi of the slab is 0.0005 to 0.025%.

11. The method of claim 9, wherein:

the slab satisfies [Equation 2]

$$1 \leq [As]/[Bi] \leq 10 \quad \text{[Equation 2]}$$

(in Equation 2, [As] and [Bi] mean a composition (wt %) of As and a composition (wt %) of Bi in a slab, respectively.

12. The method of claim 9, wherein:

the slab further comprises one or more of 0.0040 wt % or less (excluding 0 wt %) of N, 0.0040 wt % or less (excluding 0 wt %) of C, 0.0040 wt % or less (excluding 0 wt %) of S, 0.0040 wt % or less (excluding 0 wt %) of Ti, 0.0040 wt % or less (excluding 0 wt %) of Nb, and 0.0040 wt % or less (excluding 0 wt %) of V.

13. The method of claim 9, after the step for manufacturing a hot-rolled sheet, further comprising a step for subjecting the hot-rolled sheet to hot-rolled sheet annealing.

* * * * *